United States Patent [19]

Kollie et al.

[11] Patent Number: 5,249,454
[45] Date of Patent: Oct. 5, 1993

[54] INSTRUMENT FOR MEASUREMENT OF VACUUM IN SEALED THIN WALL PACKETS

[76] Inventors: Thomas G. Kollie, 117 Oklahoma Ave., Oak Ridge, Tenn. 37830; Louis H. Thacker, 3727 Frostwood Rd., Knoxville, Tenn. 37921; H. Alan Fine, 949 Wishbone Cir., Lexington, Ky. 40502

[21] Appl. No.: 826,799

[22] Filed: Jan. 27, 1992

[51] Int. Cl.$^5$ .......................... G01M 3/02; G01M 3/38
[52] U.S. Cl. .......................... 73/49.3; 73/52; 73/866.5; 356/373
[58] Field of Search ............ 73/37, 52, 49.3, 866.5; 250/227.28; 356/373

[56] References Cited

U.S. PATENT DOCUMENTS

| | | | |
|---|---|---|---|
| 2,512,134 | 6/1950 | Baule | 73/37 |
| 3,117,441 | 1/1964 | Zimmerman | 73/37 |
| 3,667,281 | 6/1972 | Pfeifer | 73/37 |
| 3,940,608 | 2/1976 | Kissinger et al. | 250/227.28 |
| 4,478,070 | 10/1984 | Clifford et al. | 73/49.3 |
| 4,656,866 | 4/1987 | Aarts | 73/52 X |
| 4,709,578 | 12/1987 | Iwasaki et al. | 73/52 X |
| 4,715,215 | 12/1987 | Perhach et al. | 73/49.3 |
| 4,747,299 | 5/1988 | Fox et al. | 73/49.3 |
| 4,771,630 | 9/1988 | Croce et al. | 73/52 |
| 4,907,443 | 3/1990 | Pailler | 73/52 |

FOREIGN PATENT DOCUMENTS 0202341 10/1985 Japan .................... 73/49.3

Primary Examiner—Hezron E. Williams
Assistant Examiner—Michael Brock
Attorney, Agent, or Firm—Pitts & Brittian

[57] ABSTRACT

An instrument for the measurement of vacuum within sealed packets 12, the packets 12 having a wall 14 sufficiently thin that it can be deformed by the application of an external vacuum to small area thereof. The instrument has a detector head 18 for placement against the deformable wall 14 of the packet to apply the vacuum in a controlled manner to accomplish a limited deformation or lift of the wall 14, with this deformation or lift monitored by the application of light as via a bifurcated light pipe 20. Retro-reflected light through the light pipe is monitored with a photo detector 26. An abrupt change (e.g., a decrease) of retro-reflected light signals the wall movement such that the value of the vacuum applied through the head 18 to achieve this initiation of movement is equal to the vacuum within the packet 12. In a preferred embodiment a vacuum reference plate 44 is placed beneath the packet 12 to ensure that no deformation occurs on the reverse surface 16 of the packet. A packet production line model is also described.

18 Claims, 3 Drawing Sheets

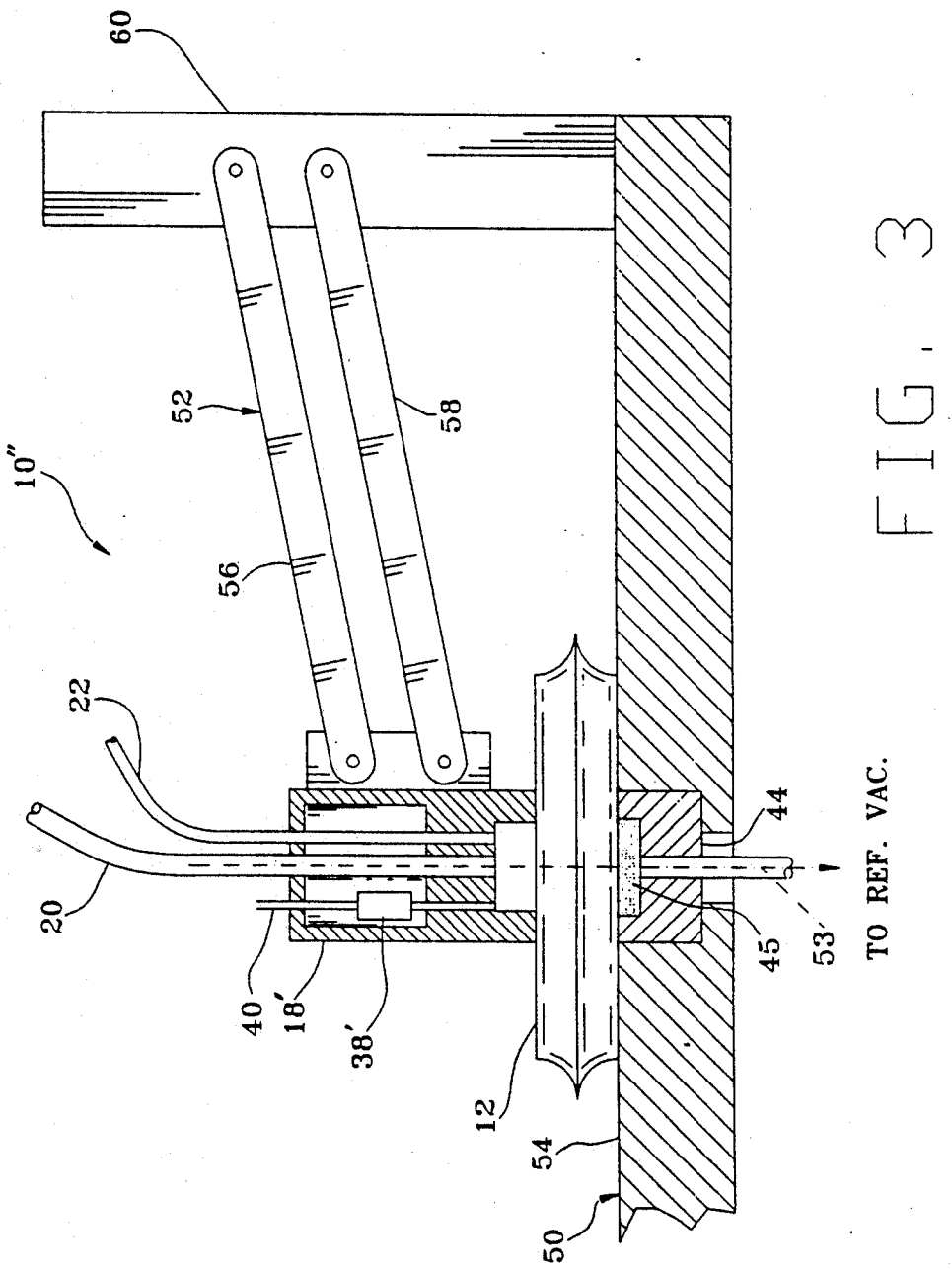

INSTRUMENT FOR MEASUREMENT OF VACUUM IN SEALED THIN WALL PACKETS

This invention was made with Government support under Contract No. DE-AC05-84OR21400 awarded by the U.S. Department of Energy. The research was funded through the Building Thermal Envelope Systems and Materials Program (BTESM) from the Office of Buildings Energy Research, Building Systems and Materials Division. The Government has certain rights in this invention.

TECHNICAL FIELD

This invention relates to the determination of vacuum in enclosed containers, and more particularly to an instrument for the measurement of vacuum in sealed, thin-walled packets such as plastic film packets.

BACKGROUND ART

There are a large number of products in industry that are encased in plastic film packets. Many of these products require the presence of a vacuum within the packets, such as for the preservation of food and drug products. Another important sealed product is the super-insulator packets of precipitated silicon dioxide powder and similar powders having low thermal conductivity in vacuum. In these and other applications it is desirable to exclude air and other gases to prevent various types of reactions with the material that is enclosed and to prevent undesirable effects on the physical properties of the packets, e.g. thermal conductivity.

There has been a need, therefore, to measure the value of the internal vacuum after the sealing operation, as well as after storage for any length of time. This measurement needs to be non-intrusive, i.e., there should be no potential intrusion into the packet.

One instrument that has been utilized in the prior art involves immersing the entire sealed packet into a vacuum system, and then "interrogating" the packet optically for movement of the film envelope when the chamber vacuum falls below the packet vacuum. This type of equipment is expensive and, more important, is time consuming when each packet must be individually tested in the vacuum chamber. In particular, this type of equipment is not readily amenable to inclusion in production line testing.

References that may be pertinent to the evaluation of this invention are U.S. Pat. Nos.: 4,478,070 issued to E. W. Clifford, et al, on Oct. 23, 1984; 4,715,215 issued to J. M. Perhach, et al, on Dec. 29, 1987; and 4,747,299 issued to J. M. Fox, et al, on May 31, 1988. All of these devices require extensive (and thus expensive) equipment, and since each packet must be evaluated, the testing is time consuming with these devices of the prior art.

Accordingly, it is an object of the present invention to provide a simple instrument that quickly measures the vacuum within sealed thin-walled packets.

It is another object of the present invention to provide a simple instrument that rapidly measures the vacuum within sealed plastic film packets.

Another object of the present invention is to provide an instrument wherein an external vacuum is applied to a localized area on the exterior of sealed plastic film packets, with means to determine when the film lifts from the content of the packet under the influence of that vacuum applied in the localized area.

Still another object of the present invention is to provide an instrument wherein an external vacuum is applied to a localized area on one exterior surface of sealed plastic film packets, with the opposite exterior surface of the packet being maintained undisturbed by that applied vacuum, with means to determine when the film lifts from the content of the packet under the influence of that vacuum applied in the localized area.

It is also an object of the present invention to provide a hand-held instrument, or one that can be used on a production line, to measure the vacuum within sealed plastic film packets.

These and other objects of the present invention will become apparent upon a consideration of the following detailed description when taken together with the drawings referenced hereinafter.

SUMMARY OF THE INVENTION

In accordance with the present invention there is provided a device for the rapid measurement of vacuum within a thin-walled packet such as a sealed plastic film packet. The device utilizes a probe having a vacuum head connected to a vacuum source, and a light-handling means to direct light upon a surface proximate the point of application of vacuum by the head, and to receive reflected light from that point. In the preferred embodiment, this light handling means is a bifurcated (retro-reflective) fiber optic light pipe. The amount of reflected light accepted by the fiber optic unit is related to the spacing relationship between the distal end of the fiber optic light pipe and the packet surface. A photo detector receives any reflected light, and the instrument provides a signal when this detected reflected light changes abruptly due to packet cover movement by the applied vacuum so as to indicate the vacuum value. The actual in-packet vacuum value is identical to the applied vacuum value at the instant the packet surface lifts. In a preferred embodiment, a selected ("reference") vacuum is applied to the exterior of the packet on an opposite surface, this reference vacuum being at least as great as that applied via the detector head. This reference vacuum maintains the opposite surface in a fixed position and balances the applied forces in the column of material within the packet between the two opposite surfaces on which the vacuums are applied, giving rise to increased accuracy of vacuum measurement within the packet.

BRIEF DESCRIPTION OF THE DRAWINGS

FIG. 3 is a drawing illustrating one embodiment of the adaption of the device of FIG. 2 for automatic or manual testing of sealed packets on a production line.

BEST MODE FOR CARRYING OUT THE INVENTION

Figure 1:
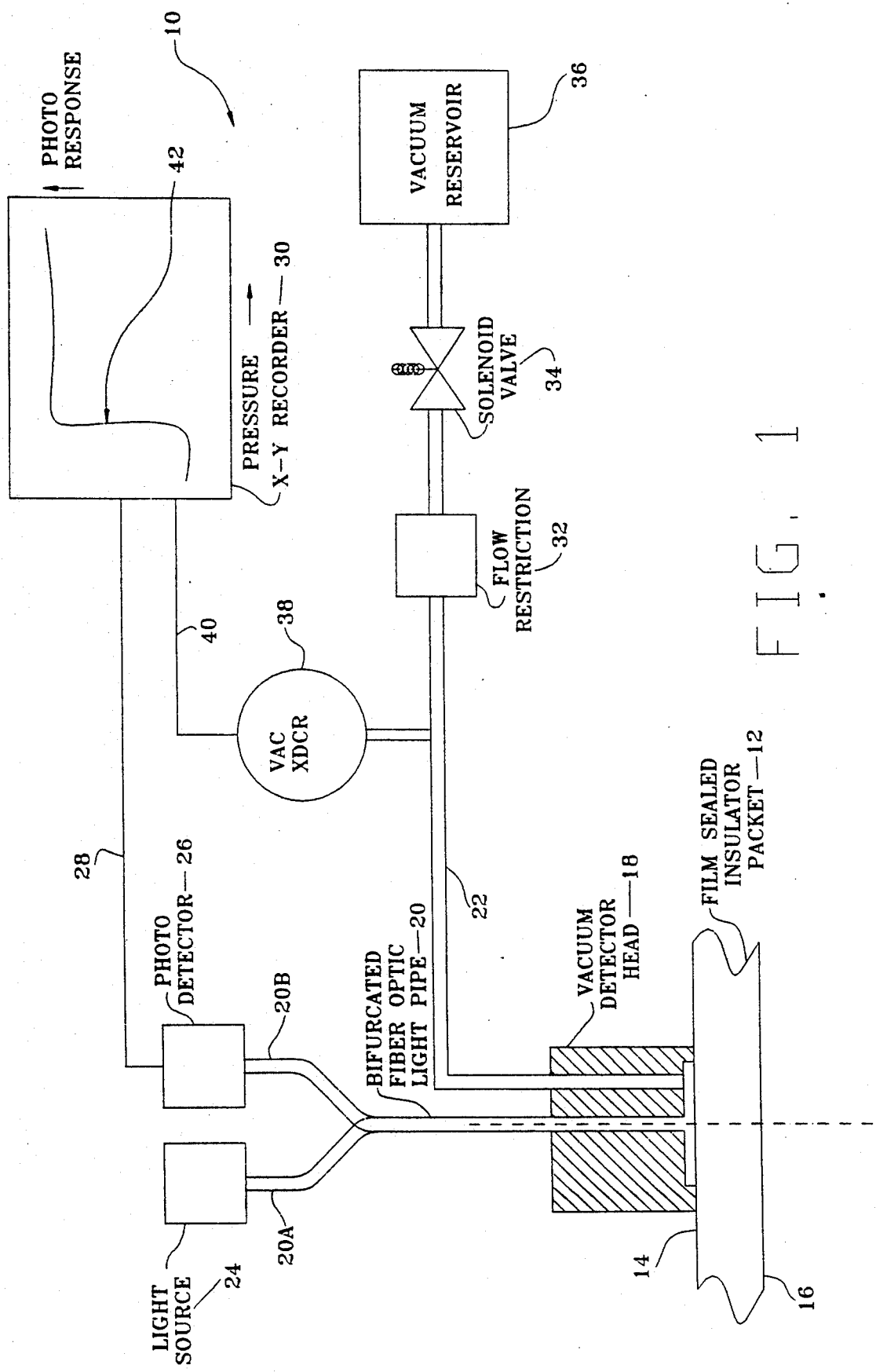
FIG. 1 is a schematic drawing of one embodiment of the present invention as used for the measurement of vacuum within sealed plastic film packets.

One embodiment of the present invention is schematically shown at 10 in FIG. 1 as applied to the measurement of vacuum within a sealed packet 12. This packet typically has top face 14 and opposite bottom face 16, as shown. While these top and bottom faces are shown as being flat, the present invention can be adapted to surfaces of other contours. A vacuum detector head 18 is applied to the packet top face 14 by any means, as by hand or by mechanism, so as to be in intimate contact therewith. This detector head 18 is the distal terminus for a bifurcated fiber optic light pipe 20 (in the preferred embodiment) and a vacuum line 22, as shown.

The light pipe 20 divides into a portion 20A that leads to a light source 24 at one proximal end whereby light can be directed against the top face 14 of the packet. The second portion 20B leads to a photo detector 26 at the other proximal end whereby an electrical signal will appear on lead 28 when light is retro-reflected from the top face 14. The amount of this retro-reflected light will change when the top face is lifted toward the distal end of the fiber optic light pipe from its normal position. This signal related to lifting of top face 14 is applied as one input to data processing equipment 30, such as an X-Y recorder depicted in this FIG. 1.

The vacuum line 22 is connected to a flow restrictor 32 to limit the air flow so as to provide an appropriate rate of pressure change at the face 14 of the packet 12. Vacuum is applied to this restrictor 32 via a valve 34 (typically a solenoid valve) from a vacuum source 36 such as a vacuum reservoir, vacuum pump, etc. A transducer 38 measures the actual Vacuum existing in the detector head 18 which is normally the vacuum in vacuum line 22, with an output signal proportional to that value being a second input to the measuring device 30 on lead 40.

It will be recognized by persons skilled in the art that what is depicted as a recorder 30 can be any data processing equipment such as a digital data acquisition and analysis system. For example, a computer can be used to record the two signals and be programmed to display the two signals on the CRT of the computer and/or give a readout of the vacuum value at which the packet face rises. Also, it can be a voltmeter system capable of recording the signals rapidly as a function of time.

In a normal operation of the embodiment of FIG. 1, the detector head 18 is placed tightly against the packet face 14. Light from the light source 24 is directed down through light pipe portion 20A so as to impinge upon the face 14, and to be retro-reflected upwardly through light pipe portion 20B to the photo detector 26 providing an initial signal on lead 28. Vacuum is gradually applied to the face 14 via the vacuum line 22, with this vacuum eventually slightly exceeding the vacuum inside the packet 12. This causes the wall 14 of the packet 12 to lift a few thousandths of an inch (e.g., one to ten thousandths). As this lifting occurs, the intensity of the retro-reflected portion of the impinging light is changed abruptly and therefore the signal of the photo detector 26 on lead 28 is changed abruptly. At the same time, the signal on lead 40 is decreasing as the vacuum is increased. These two signals then depict the actual vacuum, with a plot 42 of the two signals being available on the measuring device 30, if desired. As indicated, there is a sharp break in the plotted data at the point of lift to provide a measurement of the vacuum within the packet 12. There are some types of materials that are packed in film packets that can deform upwardly as the vacuum is applied through the head 18. This is particularly true for viscous materials, such as powders, gases and liquids, and results in an inverted "dimple" on the lower face 16. Such deformation can give rise to some error in internal packet vacuum determination.

Figure 2:
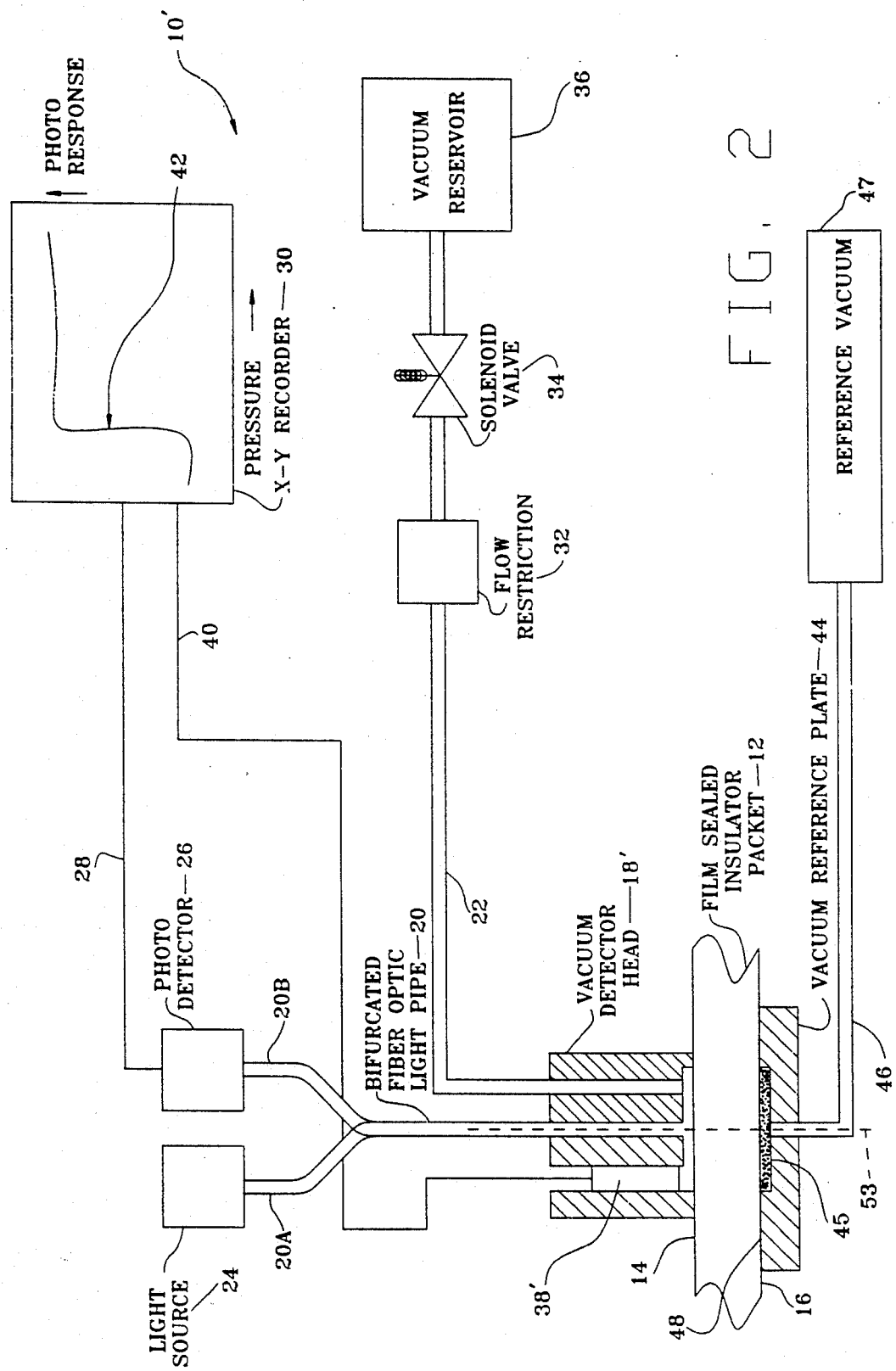
FIG. 2 is a schematic drawing of another, and preferred, embodiment of the present invention as used for the measurement of vacuum within sealed plastic film packets containing viscous materials, such as powders, gases or liquids.

In order to overcome this "transfer" of face motion, another embodiment of the present invention is shown generally at 10' in FIG. 2. Essentially all components of this embodiment 10, are the same as the embodiment 10 of FIG. 1 and therefore they carry the same identifying numerals. In addition, there is a vacuum reference plate 44 having a central porous support member 45 that supports the bottom face 16 of the packet 12. This reference plate 44 is the terminus (at the member 45) of a second vacuum line 46 that leads to a source of reference vacuum 47. The term "reference vacuum", which can be derived either from a separate vacuum source or from the afore-mentioned source 36, is meant to define a selected vacuum value that is at least equal to the vacuum to be applied to the vacuum detector head 18'. The inner surface 48 of the reference plate 44 is configured such that the application of this reference vacuum will not distort the face 16 (or the face 14) so that the instrument can function as described above. In this embodiment the vacuum transducer 38' is positioned within the detector head 18' to enhance accurate vacuum measurement.

It will be understood by persons skilled in the light pipe art that light directed to and retro-reflected from a surface will change strongly in intensity as a function of spacing between that surface and the distal end of the light pipe. Thus, the output signal of a photo detector will change abruptly when surface lift occurs.

As one of the objects of the present invention is to provide an instrument that can be used on a production line used for manufacturing sealed packets, a further embodiment of the present invention is illustrated generally at 10'' in FIG. 3. This embodiment utilized primarily the device of FIG. 2, and the components common with that embodiment carry the same identification numerals. Any components that are essentially the same as in other embodiments, and perform the same function, are identified with primed numerals.

This production line embodiment is designed for use with a work table 50 along which the sealed packets 12 are moved. The vacuum detector head 18' is supported by any suitable means 52 such that it can be raised or lowered while maintaining a axis 53 thereof at a vertical orientation with respect to the top surface 54 (and thus face 14) of the work table 50. Illustrated for this purpose are a pair of pivotable parallel arms 56, 58, each pivotally attached at one end to the detector head 18', and pivotally attached at the other ends to a support 60 that is fixed relative to the work table 50. Of course, other means of detector head 18' support can be used. Typically this support 60 is positioned such that the space between the center of the detector head 18' and the support 60 is one-half the dimension of the largest packet 12 to be tested such that the support 60 can serve as a guide for the packet 12 on the surface 54. In this embodiment, as in the embodiment of FIG. 2, the pressure transducer 38' is positioned within the detector head 18' for accuracy of measurement. Thus, in this embodiment the detector head 18' can be raised by any suitable means so that a packet 12 can be placed thereby neath after which the head 18' is lowered to the position shown. The vacuum through line 22 is gradually increased until the signals via the light pipe 20B and photo detector 26 indicate a distortion (a lift) of face 14. The vacuum value applied at this point is then the value of a vacuum existing within the packet 12.

In either of these embodiments the detector head (18, 18') is typically cylindrical having a diameter of about two inches and a height of about two inches. They are typically fabricated from aluminum; however, any suitable durable material can be used. The vacuum line 22 is typically ¼ inch in diameter, and the passageway for the light pipe 20 is typically ¼ inch in diameter. Of course, other sizes and configurations are within the scope of the present invention.

The embodiments of the present invention have been depicted as using a bifurcated light pipe whereby impinging and reflected light are perpendicular to the surface of the packet. However, it will also be recognized that other forms of light pipes can be used wherein an end of one light pipe can be arranged with respect to the surface to illuminate that surface and another light pipe can be arranged at another angle such that there is no reflection when there is no distortion, and some reflection when distortion of the face occurs. Either of these arrangements can be used on flat or curved surfaces. Also, other sources of impinging light and light detection can be substituted for the light pipe units (either bifurcated or dual).

From the foregoing, it will be understood that a simple and accurate instrument has been provided for the determination (measurement) of vacuum within a sealed packet. This instrument will serve to provide this information when the wall of the packet is sufficiently thin so as to be deformed by application of a vacuum against the surface thereof. It can be used for the random testing of individual packets, or can be used for the routine testing of packets on a production line. The desired vacuum information is readily obtained with an instrument of considerable simplicity and thus low cost.

Although the present invention has been described for the specific application to plastic film encased packets, it will be understood that it is suitable for use with metal foil enclosed packets or packets fabricated of any other material that is relatively easily deformed by the application of a localized vacuum. It will be recognized that an entire wall of the packet need not be deformable as long as a portion thereof is deformable such that the detector head can be positioned adjacent thereto.

While certain specifics of construction are given, these are for illustration purpose and not for limiting the present invention. Rather, the invention is to be limited only by the appended claims and their equivalents.

We claim:

1. An instrument for the measurement of vacuum within a sealed packet, said packet having a first deformable wall and a second oppositely disposed deformable wall, said instrument comprising:
   a detector head for positioning against said first deformable wall of said packet;
   vacuum means connected to said detector head to apply a controlled vacuum from a first vacuum source to said first deformable wall;
   light means to direct a beam of light against said first deformable wall;
   light detection means to receive light from said light means reflected from said first deformable wall and to provide a signal related to said reflected light;
   means to monitor said controlled vacuum as said controlled vacuum is applied to said first deformable wall and provide a signal related to a value of said controlled vacuum;
   plate means for uniformly supporting said packet on said second deformable wall, said plate means provided with a porous member;
   further vacuum means connected to said porous member of said plate means for applying a reference vacuum to said second deformable wall of said packet, said reference vacuum being at least equal to said controlled vacuum applied to said deformable wall; and
   means for relate said signals from said light detection means and said vacuum monitoring means to provide said measurement of vacuum within said packet.

2. The instrument of claim 1 wherein said means to relate said signals from said light detection means and said vacuum monitoring means to provide said measurement of vacuum within said packet is a digital data acquisition and analysis system which automatically and continuously correlates said signal from said light detecting means with said signal from said vacuum monitoring means, detects an abrupt change in said signal from said light detecting means, and displays a value of said vacuum in said sealed packet.

3. The instrument of claim 1 wherein said vacuum means comprises:
   a vacuum line connecting said first vacuum source to said detector head;
   valve means in said vacuum line for controlling said vacuum applied to said detector head from said first vacuum source;
   flow restriction means in said vacuum line to prevent excessive rate of application of vacuum being applied to said detector head; and
   wherein said means for monitoring said controlled vacuum is a transducer within said detector head.

4. The instrument of claim 1 wherein said light means and light detection means is a bifurcated light pipe, and further comprises:
   a light source for introducing light into one portion of said light pipe for impingement upon said deformable wall; and
   a second portion of said light pipe as retro-reflected from said deformable wall to produce said signal related to said retro-reflected light.

5. The instrument of claim 1 wherein said means for monitoring said controlled vacuum is a vacuum transducer mounted within said detector head at a point proximate to application of said controlled vacuum to said first deformable wall.

6. The instrument of claim 1 further provided with positioning means, said positioning means comprising:
   a fixed support means; and
   pivoting means connected between said fixed support means and said detector head for permitting positioning said detector head relative to said first deformable wall.

7. The instrument of claim 6 wherein said pivoting means comprises a pair of parallel pivotal arms between said support means and said detector head whereby an axis of said detector head is maintained at a fixed relationship to said first deformable surface during positioning of said detector head.

8. The instrument of claim 1 wherein said means to relate said signals from said light detection means and said vacuum monitoring means to provide said measurement of vacuum within said packet is an X-Y recorder with said signal from said light detecting means applied to a Y-axis of said recorder, and said signal from said vacuum monitoring means applied to an X-axis of said recorder.

9. An instrument for the measurement of vacuum within a sealed plastic film packet, said packet having a first deformable wall and an oppositely disposed second deformable wall, said instrument comprising:
- a detector head for positioning against said first deformable wall of said packet;
- vacuum means, including a vacuum source and regulating valving means, connected to said detector head to apply a controlled vacuum to said first deformable wall;
- a light source;
- a photo detector for generating a signal corresponding to an amount of light received by said photo detector;
- a bifurcated light pipe, one portion of said light pipe for receiving light from said light source and directing said light upon said first deformable wall, and a second portion of said light pipe for receiving retro-reflected light from said first deformable wall and directing said retro-reflected light to said photo detector;
- transducer means within said detector head to monitor said controlled vacuum as said controlled vacuum is applied to said first deformable wall and provide a signal related to a value of said controlled vacuum;
- plate means for uniformly supporting said packet on said second deformable wall, said plate means provided with a porous member;
- further vacuum means connected to said porous member of said plate means for applying a reference vacuum to said second deformable wall of said packet, said reference vacuum being at least as great as said controlled vacuum applied to said first deformable wall; and
- means to relate said signals from said photo detector and said vacuum transducer to provide said measurement of vacuum within said packet.

10. The instrument of claim 9 further provided with positioning means, said positioning means comprising:
- a fixed support means; and
- a pair of parallel pivotable arms said detector head for permitting positioning said detector head relative to said first deformable wall whereby an axis of said detector head maintains a fixed angular relationship to said first deformable wall during positioning of said detector head.

11. An instrument for the measurement of vacuum within a sealed packet, said packet having a first and second deformable walls on opposite sides thereof, said instrument comprising:
- a detector head for positioning against said first deformable wall of said packet;
- vacuum means connected to said detector head to apply a controlled vacuum to said first deformable wall;
- plate means for uniformly supporting said packet on said second deformable wall, said plate means provided with a porous support member;
- further vacuum means connected to said porous support member of said plate means for applying a reference vacuum to said second deformable wall of said packet, said reference vacuum being at least as great as said controlled vacuum applied to said first deformable wall;
- light means to direct a beam of light against said first deformable wall;
- light detection means to receive light from said light means reflected from said first deformable wall and to provide a signal related to said reflected light;
- means to monitor said controlled vacuum in said detector head as said vacuum is applied to said first deformable wall and provide a signal related to a value of said vacuum; and
- means to relate said signals from said light detection means and said vacuum monitoring means to provide said measurement of vacuum within said packet.

12. An instrument for the measurement of vacuum within a sealed packet, said packet having first and second deformable walls on opposite sides thereof, said instrument comprising:
- a detector head for positioning against a localized area of said first deformable wall of said packet;
- vacuum means connected to said detector head to apply a controlled vacuum to said first deformable wall;
- plate means for supporting said packet on said second deformable wall, said plate means provided with a porous support member;
- further vacuum means connected to said porous support member of said plate means for applying a reference vacuum to said second deformable wall of said packet, said reference vacuum being at least as great as said controlled vacuum applied to said first deformable wall;
- a light source and a first fiber optic means to direct a beam of light against said first deformable wall;
- a photo detector and a second fiber optic means to receive light from said light source and first optic means retro-reflected from said first deformable wall and to provide a signal of a value related to an intensity of said retro-reflected light;
- monitoring means within said detector head to monitor said controlled vacuum in said detector head as said controlled vacuum is applied to said first deformable wall and provide a signal related to a value of said controlled vacuum; and
- means to relate said signals from said photo detector and said vacuum monitoring means to provide said measurement of vacuum within said packet when initial deformation of said first deformable wall occurs.

13. The instrument of claim 12 wherein said first and second fiber optic means jointly comprise a bifurcated light pipe
- wherein said light source introduces light into said first fiber optic means of said bifurcated light pipe for impingement on said first deformable wall; and
- wherein said photo detector receives light from said second fiber optic means of said bifurcated light pipe as retro-reflected from said first deformable wall to produce said signal related to said retro-reflected light.

14. The instrument of claim 12 wherein said vacuum means comprises:
- a vacuum source;
- a vacuum line connecting said vacuum source to said detector head;
- valve means in said vacuum line for controlling said vacuum applied to said detector head;
- flow restriction means in said vacuum line to prevent excessive rate of application of vacuum being applied to said detector head; and wherein said means for monitoring said controlled vacuum in a transducer to produce an electrical signal corresponding to said controlled vacuum within said detector head.

15. The instrument of claim 12 wherein said means to relate said signals from said photo detector and said vacuum monitoring means to provide said measurement of vacuum within said packet is a digital data acquisition and analysis system which automatically and continuously correlates said signal from said photo detector with said signal from said vacuum monitoring means, detects an abrupt change in said signal from said photo detector, and displays a value of said vacuum in said sealed packet at said abrupt change in said signal from said photo detector.

16. The instrument of claim 12 wherein said means to relate said signals from said light detection means and said vacuum monitoring means to provide said measurement of said vacuum within said sealed packet is an X-Y recorder, with aid signal from said photo detector applied to a Y-axis of said recorder, and said signal from said vacuum monitoring means applied to an X-axis of said recorder.

17. The instrument of claim 12 further provided with positioning means, said positioning means comprising:
   a fixed support means; and
   pivoting means connected between said fixed support means and said detector head for permitting positioning said detector head relative to said deformable wall.

18. The instrument of claim 17 wherein said pivoting means comprises a pair of parallel pivotal arms between said support means and said detector head whereby an axis of said detector head is maintained at a fixed relationship to said deformable wall during positioning of said detector head.

* * * * *